United States Patent
Chen

(10) Patent No.: US 10,361,833 B2
(45) Date of Patent: Jul. 23, 2019

(54) METHOD AND APPARATUS FOR IMPROVING DEVICE TO DEVICE (D2D) COMMUNICATION IN A WIRELESS COMMUNICATION SYSTEM

(71) Applicant: INNOVATIVE SONIC CORPORATION, Taipei (TW)

(72) Inventor: Wei-Yu Chen, Taipei (TW)

(73) Assignee: Innovative Sonic Corporation, Taipei (TW)

( * ) Notice: Subject to any disclaimer, the term of this patent is extended or adjusted under 35 U.S.C. 154(b) by 528 days.

(21) Appl. No.: 14/566,022

(22) Filed: Dec. 10, 2014

(65) Prior Publication Data

US 2015/0163791 A1 Jun. 11, 2015

Related U.S. Application Data

(60) Provisional application No. 61/914,583, filed on Dec. 11, 2013.

(51) Int. Cl.
*H04W 52/36* (2009.01)
*H04L 5/00* (2006.01)
(Continued)

(52) U.S. Cl.
CPC .......... *H04L 5/0057* (2013.01); *H04L 5/0053* (2013.01); *H04W 4/80* (2018.02); *H04W 52/365* (2013.01); *H04W 52/383* (2013.01)

(58) Field of Classification Search
CPC . H04L 15/0057; H04L 5/0057; H04L 5/0053; H04W 4/008; H04W 52/365; H04W 52/383; H04W 4/80
See application file for complete search history.

(56) References Cited

U.S. PATENT DOCUMENTS

2010/0110895 A1* 5/2010 Wu ................ H04W 28/06
370/241
2010/0296470 A1* 11/2010 Heo ................ H04W 52/365
370/329

(Continued)

FOREIGN PATENT DOCUMENTS

WO 2014161486 A1 10/2014

OTHER PUBLICATIONS

3GPP TS 36.321 V11.3.0 (Jun. 2013).
TW Patent Application No. 103143212 dated Nov. 24, 2015.

*Primary Examiner* — Matthew C Sams
(74) *Attorney, Agent, or Firm* — Blue Capital Law Firm, P.C.

(57) ABSTRACT

Methods and apparatuses for improving device to device (D2D) communication are disclosed herein. One method includes communicating, by a user equipment (UE), with a device via the D2D communication. The method further includes triggering, by the UE, a first power headroom report (PHR) to indicate a power status of the D2D. The method also provides for triggering and transmitting, by the UE, a Scheduling Request (SR) to ask for radio resources from a network for scheduling if the UE has no available resources to transmit the first PHR. The method further includes triggering, by the UE, a second PHR to indicate a power status of a transmission path from the UE to the network and not triggering and transmitting the SR to ask for radio resources from the network for scheduling if the UE has no available resource to transmit the second PHR.

38 Claims, 5 Drawing Sheets

(51) Int. Cl.
*H04W 4/80* (2018.01)
*H04W 52/38* (2009.01)

(56) References Cited

U.S. PATENT DOCUMENTS

| | | | | |
|---|---|---|---|---|
| 2012/0087317 | A1* | 4/2012 | Bostrom | H04W 52/30 370/329 |
| 2013/0225228 | A1* | 8/2013 | Park | H04W 24/10 455/522 |
| 2013/0322413 | A1* | 12/2013 | Pelletier | H04W 72/1289 370/336 |
| 2014/0094119 | A1* | 4/2014 | Stojanovski | H04W 52/0258 455/41.1 |
| 2015/0055532 | A1* | 2/2015 | Lu | H04W 76/043 370/311 |
| 2015/0071212 | A1* | 3/2015 | Kim | H04W 72/042 370/329 |
| 2015/0358991 | A1* | 12/2015 | Park | H04W 52/0238 370/336 |
| 2016/0128003 | A1* | 5/2016 | Callender | H04W 52/365 370/311 |

* cited by examiner

METHOD AND APPARATUS FOR IMPROVING DEVICE TO DEVICE (D2D) COMMUNICATION IN A WIRELESS COMMUNICATION SYSTEM

CROSS-REFERENCE TO RELATED APPLICATIONS

The present Application claims the benefit of U.S. Provisional Patent Application Ser. No. 61/914,583 filed on Dec. 11, 2013, the entire disclosure of which is incorporated herein by reference.

FIELD

This disclosure generally relates to wireless communication networks, and more particularly, to methods and apparatuses for adjusting resources by a network for device to device communications and provides for Quality of Service guarantees for device to device communications.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

Methods and apparatuses for improving device to device (D2D) communication are disclosed herein. One method includes communicating, by a user equipment (UE), with a device via D2D communication. The method further includes triggering, by the UE, a first power headroom report (PHR) to indicate a power status of the D2D communication. The method also provides for triggering and transmitting, by the UE, a Scheduling Request (SR) to ask for radio resources from a network for scheduling if the UE has no available resources to transmit the first PHR. The method further includes triggering, by the UE, a second PHR to indicate a power status of a transmission path from the UE to the network and not triggering and transmitting the SR to ask for radio resources from the network for scheduling if the UE has no available resource to transmit the second PHR.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. SP-110638, "WID on Proposal for a study on Proximity-based Services", TR22.803 V12.2.0, "Feasibility study for Proximity Services (ProSe) (Release 12)", R2-133486, "Access schemes for D2D broadcast communications", and TS36.321 V11.2.0, "E-UTRA MAC protocol specification." The standards and documents listed above are hereby expressly incorporated by reference in their entirety.

Figure 1:
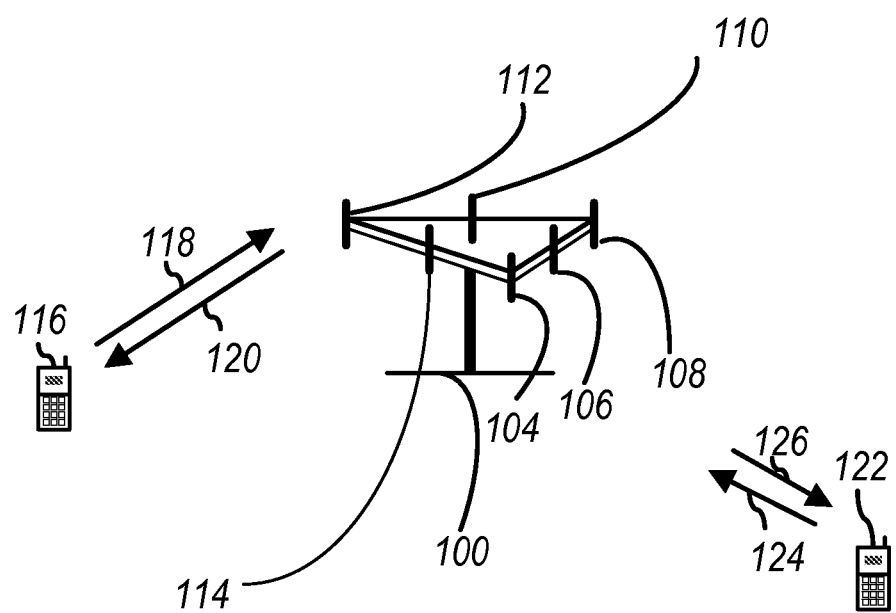
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNB, or some other terminology. An access terminal (AT) may also be called user equipment (UE), a wireless communication device, terminal, access terminal or some other terminology.

Figure 2:
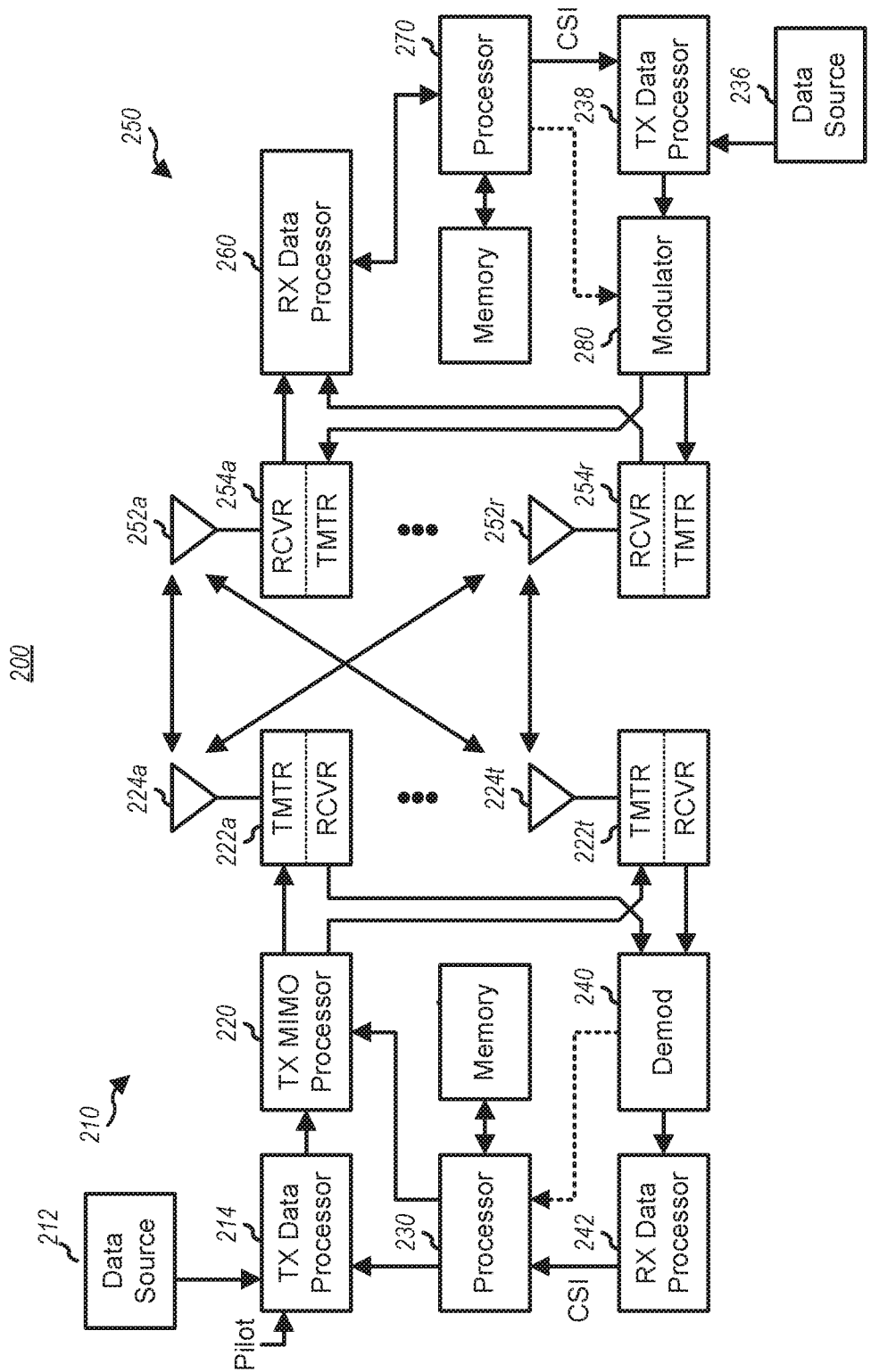
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
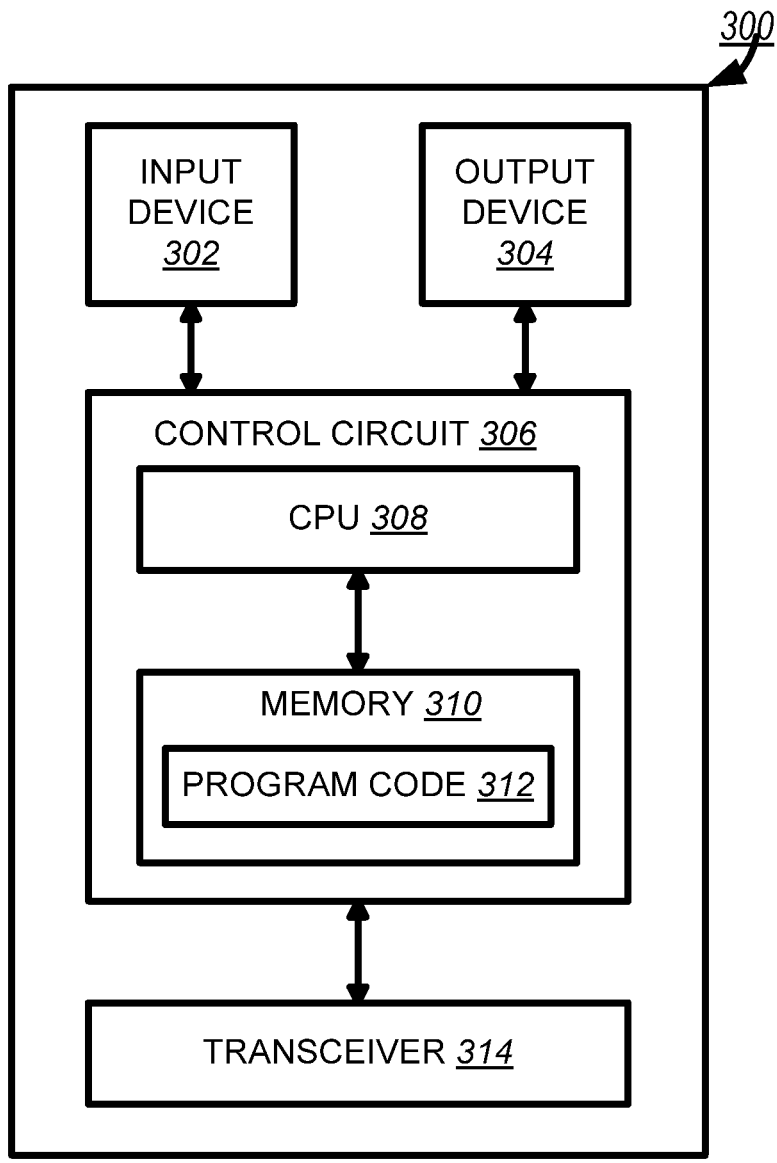
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
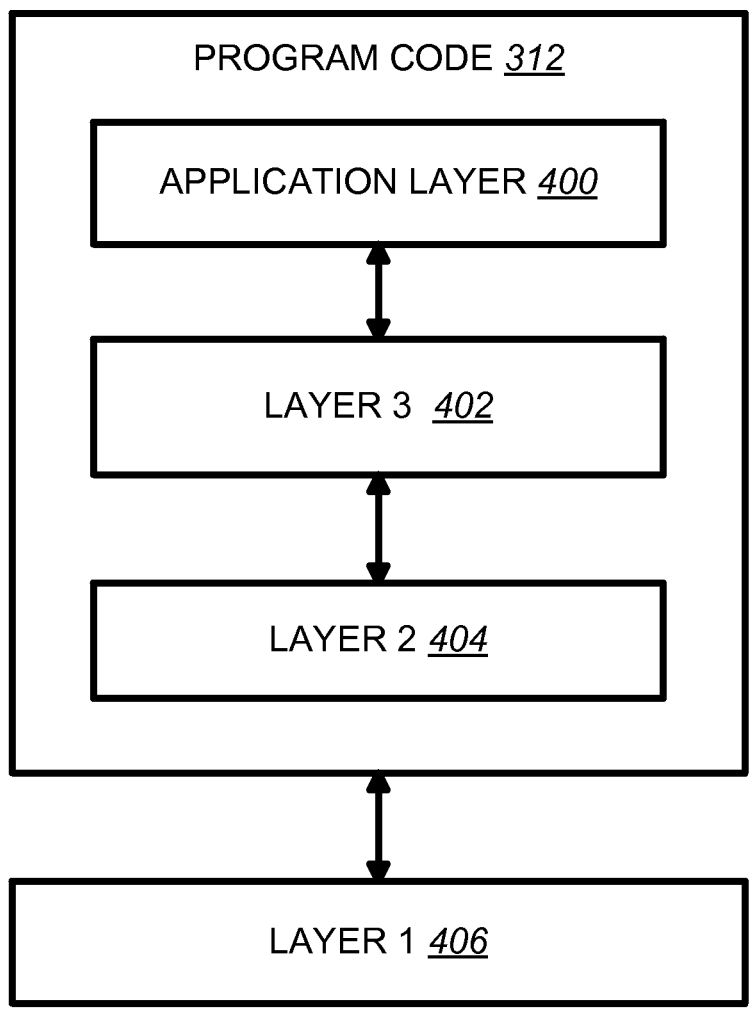
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE or LTE-A systems, the Layer 2 portion may include a Radio Link Control (RLC) layer and a Medium Access Control (MAC) layer. The Layer 3 portion may include a Radio Resource Control (RRC) layer.

In 3GPP SP-110638, a new study item for proximity-based services (ProSe) was proposed. The objective of this study item is described in 3GPP SP-110638 as follows:

3 Justification

Proximity-based applications and services represent a recent and enormous socio-technological trend. The principle of these applications is to discover instances of the applications running in devices that are within proximity of each other, and ultimately also exchange application-related data. In parallel, there is interest in proximity-based discovery and communications in the public safety community.

Current 3GPP specification are only partially suited for such needs, since all such traffic and signalling would have to be routed in the network, thus impacting their performance and adding un-necessary load in the network. These current limitations are also an obstacle to the creation of even more advanced proximity-based applications.

In this context, 3GPP technology, has the opportunity to become the platform of choice to enable proximity-based discovery and communication between devices, and promote a vast array of future and more advanced proximity-based applications.

4 Objective

The objective is to study use cases and identify potential requirements for an operator network controlled discovery and communications between devices that are in proximity, under continuous network control, and are under a 3GPP network coverage, for:
1. Commercial/social use
2. Network offloading
3. Public Safety
4. Integration of current infrastructure services, to assure the consistency of the user experience including reachability and mobility aspects Additionally, the study item will study use cases and identify potential requirements for
5. Public Safety, in case of absence of EUTRAN coverage (subject to regional regulation and operator policy, and limited to specific public-safety designated frequency bands and terminals)

Use cases and service requirements will be studied including network operator control, authentication, authorization, accounting and regulatory aspects.

The study does not apply to GERAN or UTRAN.

3GPP TR22.803 discloses radio resource allocation for device to device (D2D) communication, monitoring, and D2D communication characteristics as follows:

[PR.29] The system shall be capable of monitoring the communication characteristics (e.g. channel condition, QoS of the path, volume of the traffic, etc.) on the E-UTRA ProSe communication path, regardless of whether there is data transferred via infrastructure path.

[ . . . ]

[PR.34] The Radio Access Network shall control the radio resources associated with the E-UTRA ProSe Communication path.

[ . . . ]

[PR.124] The operator network shall be able to continuously control the use of E-UTRAN resources for ProSe Discovery and ProSe Communication between UEs, as long as at least one of these UEs is under E-UTRAN coverage and using operator's spectrum.

In R2-133486, there are two models for controlling radio resources of D2D communication as quoted below:

Currently, there are two possible radio resource allocation schemes for D2D Communication:

Coordinated Access: In such an access scheme, there exists a cluster head which acts as a resource allocation controller. In network coverage case, the cluster head can either be the eNB or a dispatcher. While in the out-of-coverage public safety case, the cluster head is the dispatcher. The coordinated access is like the current dynamic scheduling in which the UE is scheduled with resources for every D2D transmission or like the SPS scheduling in which the UE is scheduled with periodic resources for D2D transmission.

Uncoordinated Access: Such access scheme allows the UE to autonomous allocate resources itself from a pool of semi-statically configured resource blocks. As it is uncoordinated, the resources allocated are in contention as another UE may allocate itself the same resources. The uncoordinated access is similar to the random selection of the preamble on a pool of resources. Some form of collision handling mechanism (e.g. CSMA/CA or CSMA/CD) is needed to avoid/resolve/detect collision.

3GPP TS 36.321 discusses Power Headroom Reporting (PHR) features in MAC layer as quoted below:

5.4.6 Power Headroom Reporting

The Power Headroom reporting procedure is used to provide the serving eNB with information about the difference between the nominal UE maximum transmit power and the estimated power for UL-SCH transmission per activated Serving Cell and also with information about the difference between the nominal UE maximum power and the estimated power for UL-SCH and PUCCH transmission on PCell.

The reporting period, delay and mapping of Power Headroom are defined in subclause 9.1.8 of [9]. RRC controls Power Headroom reporting by configuring the two timers periodicPHR-Timer and prohibitPHR-Timer, and by signalling dl-PathlossChange which sets the change in measured downlink pathloss and the required power backoff due to power management (as allowed by P-MPR$_c$ [10]) to trigger a PHR [8].

A Power Headroom Report (PHR) shall be triggered if any of the following events occur:

prohibitPHR-Timer expires or has expired and the path loss has changed more than dl-PathlossChange dB for at least one activated Serving Cell which is used as a pathloss reference since the last transmission of a PHR when the UE has UL resources for new transmission;

periodicPHR-Timer expires;

upon configuration or reconfiguration of the power headroom reporting functionality by upper layers [8], which is not used to disable the function;

activation of an SCell with configured uplink.

prohibitPHR-Timer expires or has expired, when the UE has UL resources for new transmission, and the following is true in this TTI for any of the actived Serving Cells with configured uplink:

there are UL resources allocated for transmission or there is a PUCCH transmission on this cell, and the required power backoff due to power management (as allowed by P-MPR$_c$ [10]) for this cell has changed more than dl-PathlossChange dB since the last transmission of a PHR when the UE had UL resources allocated for transmission or PUCCH transmission on this cell.

NOTE: The UE should avoid triggering a PHR when the required power backoff due to power management decreases only temporarily (e.g. for up to a few tens of milliseconds) and it should avoid reflecting such temporary decrease in the values of $P_{CMAX,c}$/PH when a PHR is triggered by other triggering conditions.

If the UE has UL resources allocated for new transmission for this TTI:

if it is the first UL resource allocated for a new transmission since the last MAC reset, start periodicPHR-Timer;

if the Power Headroom reporting procedure determines that at least one PHR has been triggered and not cancelled, and;
if the allocated UL resources can accommodate a PHR MAC control element plus its subheader if extendedPHR is not configured, or the Extended PHR MAC control element plus its subheader if extendedPHR is configured, as a result of logical channel prioritization:
  if extendedPHR is configured:
    for each activated Serving Cell with configured uplink:
      obtain the value of the Type 1 power headroom;
      if the UE has UL resources allocated for transmission on this Serving Cell for this TTI:
        obtain the value for the corresponding $P_{CMAX,c}$ field from the physical layer;
      if simultaneousPUCCH-PUSCH is configured:
        obtain the value of the Type 2 power headroom for the PCell;
        if the UE has a PUCCH transmission in this TTI:
          obtain the value for the corresponding $P_{CMAX,c}$ field from the physical layer;
    instruct the Multiplexing and Assembly procedure to generate and transmit an Extended PHR MAC control element as defined in subclause 6.1.3.6a based on the values reported by the physical layer;
  else:
    obtain the value of the Type 1 power headroom from the physical layer;
    instruct the Multiplexing and Assembly procedure to generate and transmit a PHR MAC control element as defined in subclause 6.1.3.6 based on the value reported by the physical layer;
  start or restart periodicPHR-Timer;
  start or restart prohibitPHR-Timer;
  cancel all triggered PHR(s).
3GPP TS 36.321 discusses Scheduling Requests as quoted below:
5.4.4 Scheduling Request
The Scheduling Request (SR) is used for requesting UL-SCH resources for new transmission.
When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR (see subclause 5.4.5), or when the UL grant(s) can accommodate all pending data available for transmission.
If an SR is triggered and there is no other SR pending, the UE shall set the SR_COUNTER to 0.
As long as one SR is pending, the UE shall for each TTI:
  if no UL-SCH resources are available for a transmission in this TTI:
    if the UE has no valid PUCCH resource for SR configured in any TTI: initiate a Random Access procedure (see subclause 5.1) on the PCell and cancel all pending SRs;
    else if the UE has a valid PUCCH resource for SR configured for this TTI and if this TTI is not part of a measurement gap and if sr-ProhibitTimer is not running:
      if SR_COUNTER<dsr-TransMax:
        increment SR_COUNTER by 1;
        instruct the physical layer to signal the SR on PUCCH;
        start the sr-ProhibitTimer.
      else:
        notify RRC to release PUCCH/SRS for all serving cells;
        clear any configured downlink assignments and uplink grants;
        initiate a Random Access procedure (see subclause 5.1) on the PCell and cancel all pending SRs.

Generally, assuming the Coordinated Access scheme is adopted for D2D communication, the resource allocation is controlled by the cluster head/eNB. Accordingly, the UE would need to provide some necessary information to the cluster head/eNB for realizing the resource control of D2D communication. In normal uplink (UL) communication, information such as buffer status reporting (BSR) and power headroom reporting (PHR) need to be provided to the eNB for allocating resource.

If a unicast of D2D communication uses a limited power maximum value, it is possible that a reused power control feature will be PHR to fulfill requirement and reuse features of LTE. PHR provides a report of how much transmission power is left for a UE to use in addition to current transmission power. Based on UE's PHR, the Network can decide whether the resource allocation of the UE will or will not be changed. If PHR information about D2D communication is provided to the network, then the network can reallocate resources to the UE's D2D communication as normal UL behavior according to the D2D's PHR. Furthermore, the PHR also can provide reference information to the network in order to determine whether the communication path will or will not be changed for the D2D communication service. However, in order to support PHR for D2D communication, various portions of the PHR will need to be modified, which will result in a new type of PHR for the network. This new type of PHR will also be expected to be transmitted to the network through normal UL transmission.

Unfortunately, the PHR would not trigger grant requesting procedure according to the MAC specification. If the UE has a data session on D2D communication and not on a normal cellular communication, the network would have to provide a grant to PHR so that it may be triggered periodically. As a result, the PHR will be pending until a grant from network or UL data arrival. Without a modified PHR, the network may not be able to reallocate resource for D2D communication. In this scenario, resources may be wasted or Quality of Service (QoS) cannot be guaranteed.

In order to avoid the wasting of resources or QoS maintenance, various embodiments are directed to reusing PHR to help the network to allocate and/or reallocate resources for D2D communication. More specifically, if there is no grant for a PHR triggered by D2D communication, the PHR will trigger a Scheduling Request (SR) for requesting a UL grant to transmit the PHR to the network.

One exemplary method includes communicating, by a user equipment (UE), with a device via D2D communication. The method further includes triggering, by the UE, a first power headroom report (PHR) to indicate a power status of the D2D communication. The method also provides for triggering and transmitting, by the UE, a Scheduling Request (SR) to ask for radio resources from a network for scheduling if the UE has no available resources to transmit the first PHR. The method further includes triggering, by the UE, a second PHR to indicate a power status of a transmission path from the UE to the network and not triggering and transmitting the SR to ask for radio resources from the network for scheduling if the UE has no available resource to transmit the second PHR. In another exemplary embodiment, the method includes triggering the Scheduling Request in a Transmission Time Interval (TTI) which the first PHR is triggered.

In another method, the D2D communication is device to device proximity-based service (ProSe) direct communication. In various methods, the first PHR is a new type of PHR, wherein the first PHR is different from power headroom MAC control element and extended power headroom control element. In one embodiment, the first PHR contains indication used for distinguishing the D2D communication from other Device to Device communications. And other D2D communications are associated to different communication peers or transmission targets comparing with the D2D communication. In another embodiment, the first PHR contains the identity of the D2D communication. In one embodiment, the power status is power difference between current used power value and the maximum power value which can be used in Device to Device communication.

In another embodiment, the radio resource is an uplink grant. In one embodiment, the first PHR is a MAC control element. And the first PHR is triggered by fulfilling at least one of the conditions which listed below or the combination of the conditions. In one embodiment, the first PHR is triggered by the D2D communication. In another embodiment, the first PHR is triggered by a change of path loss of the D2D communication. In another embodiment, the first PHR is triggered by a change of power value of the D2D communication. In another embodiment, the first PHR is triggered by an expiration of a timer for the D2D communication. In another embodiment, the first PHR is triggered by a Channel Quality Indicator (CQI) report of Device to Device communication.

In yet another embodiment, the first PHR or SR are transmitted to an evolved Node B (eNB) or a relay node. In one embodiment, the second PHR is triggered by periodic timer expiry. Alternatively, the second PHR is triggered by a change of downlink path loss larger than a threshold. Alternatively, the second PHR is triggered by the configuration or reconfiguration of PHR functionality. Alternatively, the second PHR is triggered by activation of an SCell with configured uplink.

Figure 5:
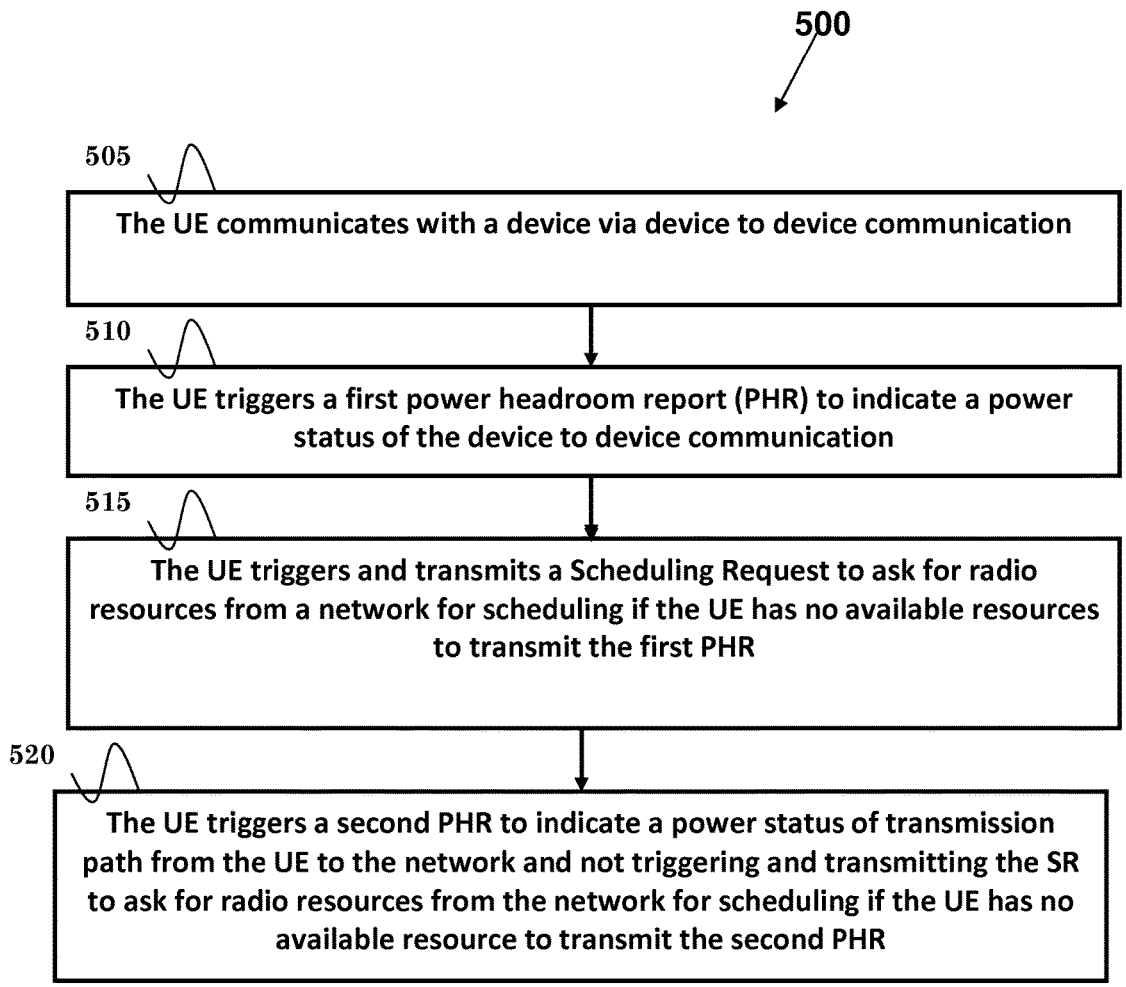
FIG. 5 is a flow diagram illustrating one exemplary embodiment.

FIG. 5 illustrates one exemplary method 500 for changing a measured signal on a cell, wherein a user equipment (UE) is served by a first cell. At step 505, the UE communicates with a device via D2D communication. At step 510, the UE triggers a first power headroom report (PHR) to indicate a power status of the D2D communication. At step 515, the UE triggers and transmits a Scheduling Request (SR) to ask for radio resources from a network for scheduling if the UE has no available resources to transmit the first PHR. At step 520, the UE triggers a second PHR to indicate a power status of a transmission path from the UE to the network and not triggering and transmitting the SR to ask for radio resources from the network for scheduling if the UE has no available resource to transmit the second PHR.

Referring back to FIGS. 3 and 4, the device 300 includes a program code 312 stored in memory 310 for changing measured signal on a cell, wherein a UE is served by a first cell. In one embodiment, the CPU 308 could execute program code 312 to enable the UE (i) to communicate with a device via D2D communication, (ii) to trigger a first power headroom report (PHR) to indicate a power status of the D2D communication, (iii) to trigger and transmit a Scheduling Request (SR) to ask for radio resources from a network for scheduling if the UE has no available resources to transmit the first PHR, and (iv) to trigger a second PHR to indicate a power status of a transmission path from the UE to the network and not triggering and transmitting the SR to ask for radio resources from the network for scheduling if the UE has no available resource to transmit the second PHR. In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for improving device to device (D2D) communication, the method comprising:
communicating, by a user equipment (UE), with a device via the D2D communication;
triggering, by the UE, a first power headroom report (PHR) to indicate a power status of the D2D communication;
triggering and transmitting, by the UE, a first Scheduling Request (SR) to ask for radio resources from a network for scheduling to transmit the first PHR because the UE has no available resources to transmit the first PHR, wherein the first SR is triggered because there is no grant for the first PHR triggered for the D2D communication; and
triggering, by the UE, a second PHR to indicate a power status of a transmission path from the UE to the network and not triggering and transmitting a second SR to ask for radio resources from the network for scheduling because the UE has no available resource to transmit the second PHR.

2. The method of claim 1, wherein the D2D communication is device to device proximity-based service (ProSe) direct communication.

3. The method of claim 1, wherein the first PHR is different from a power headroom Medium Access Control (MAC) control element and an extended power headroom control element.

4. The method of claim 1, wherein the first PHR contains an indication used for distinguishing the D2D communication from other Device to Device (D2D) communications.

5. The method of claim 1, wherein the first PHR contains an identity of the D2D communication.

6. The method of claim 1, wherein the power status is power difference between current used power value and the maximum power value which can be used in D2D communication.

7. The method of claim 1, wherein the radio resource is an uplink grant.

8. The method of claim 1, wherein the first PHR is a MAC control element.

9. The method of claim 1, wherein the first PHR is triggered by a change of path loss of the D2D communication.

10. The method of claim 1, wherein the first PHR is triggered by a change of power value of the D2D communication.

11. The method of claim 1, wherein the first PHR is triggered by an expiration of a timer for the D2D communication.

12. The method of claim 1, wherein the first PHR is triggered by a Channel Quality Indicator (CQI) report of Device to Device communication.

13. The method of claim 1, wherein the first PHR is triggered by the D2D communication.

14. The method of claim 1, wherein the first PHR is transmitted to an evolved Node B (eNB) or a relay node.

15. The method of claim 1, further comprising:
triggering the first SR in a Transmission Time Interval (TTI) which the first PHR is triggered.

16. The method of claim 1, wherein the second PHR is triggered by periodic timer expiry.

17. The method of claim 1, wherein the second PHR is triggered by a change of downlink path loss larger than a threshold.

18. The method of claim 1, wherein the second PHR is triggered by the configuration or reconfiguration of PHR functionality.

19. The method of claim 1, wherein the second PHR is triggered by activation of an SCell with configured uplink.

20. A communication device for improving device to device (D2D) communication, the communication device comprising:
a control circuit;
a processor installed in the control circuit;
a memory installed in the control circuit and operatively coupled to the processor;
wherein the processor is configured to execute a program code stored in memory to enable the UE to:

communicate with a device via the D2D communication;

trigger a first power headroom report (PHR) to indicate a power status of the D2D;

trigger and transmit a first Scheduling Request (SR) to ask for radio resources from a network for scheduling to transmit the first PHR if the UE has no available resources to transmit the first PHR, wherein the first SR is triggered even if there is no grant for the first PHR triggered for the D2D communication; and trigger a second PHR to indicate a power status of a transmission path from the UE to the network and not trigger and transmit a second SR to ask for radio resources from the network for scheduling if the UE has no available resource to transmit the second PHR.

21. The communication device of claim 20, wherein the D2D communication is device to device proximity-based service (ProSe) direct communication.

22. The communication device of claim 20, wherein the first PHR is different from a power headroom Medium Access Control (MAC) control element and an extended power headroom control element.

23. The communication device of claim 20, wherein the first PHR contains an indication used for distinguishing the D2D communication from other Device to Device (D2D) communications.

24. The communication device of claim 20, wherein the first PHR contains an identity of the D2D communication.

25. The communication device of claim 20, wherein the power status is power difference between current used power value and the maximum power value which can be used in D2D communication.

26. The communication device of claim 20, wherein the radio resource is an uplink grant.

27. The communication device of claim 20, wherein the first PHR is a MAC control element.

28. The communication device of claim 20, wherein the first PHR is triggered by a change of path loss of the D2D communication.

29. The communication device of claim 20, wherein the first PHR is triggered by a change of power value of the D2D communication.

30. The communication device of claim 20, wherein the first PHR is triggered by an expiration of a timer for the D2D communication.

31. The communication device of claim 20, wherein the first PHR is triggered by a Channel Quality Indicator (CQI) report of Device to Device communication.

32. The communication device of claim 20, wherein the first PHR is triggered by the D2D communication.

33. The communication device of claim 20, wherein the first PHR is transmitted to an evolved Node B (eNB) or a relay node.

34. The communication device of claim 20, further comprising:

triggering the first SR in a Transmission Time Interval (TTI) which the first PHR is triggered.

35. The communication device of claim 20, wherein the second PHR is triggered by periodic timer expiry.

36. The communication device of claim 20, wherein the second PHR is triggered by a change of downlink path loss larger than a threshold.

37. The communication device of claim 20, wherein the second PHR is triggered by the configuration or reconfiguration of PHR functionality.

38. The communication device of claim 20, wherein the second PHR is triggered by activation of an SCell with configured uplink.

* * * * *